United States Patent
Raamadhurai et al.

(10) Patent No.: US 10,997,507 B2
(45) Date of Patent: May 4, 2021

(54) DATA RECONCILIATION (71) Applicant: ACCENTURE GLOBAL SOLUTIONS LIMITED, Dublin (IE)

(72) Inventors: Srikrishna Raamadhurai, Bangalore (IN); Abhishek Datta Sharma, Bangalore (IN); Siddhartha Asthana, Bangalore (IN); Suresh Venkatasubramaniyan, Bangalore (IN); Himani Shukla, Bangalore (IN); Madhura Shivaram, Bangalore (IN); Chung-Sheng Li, Scarsdale, NY (US)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 971 days.

(21) Appl. No.: 15/611,471

(22) Filed: Jun. 1, 2017

(65) Prior Publication Data

US 2018/0349776 A1 Dec. 6, 2018

(51) Int. Cl.
*G06N 5/02* (2006.01)
*G06Q 40/00* (2012.01)
*G06K 9/62* (2006.01)
*G06N 20/00* (2019.01)

(52) U.S. Cl.
CPC ........... *G06N 5/025* (2013.01); *G06K 9/6219* (2013.01); *G06N 20/00* (2019.01); *G06Q 40/12* (2013.12); *G06K 2209/01* (2013.01)

(58) Field of Classification Search
CPC .................................................... G06Q 40/12
See application file for complete search history.

(56) References Cited

U.S. PATENT DOCUMENTS

| 7,603,358 | B1* | 10/2009 | Anderson | G06F 21/6218 |
| 8,473,430 | B2* | 6/2013 | Yu | G06N 5/02 |
| | | | | 706/12 |
| 9,535,918 | B1* | 1/2017 | Reddy | G06F 16/2379 |
| 2011/0029467 | A1* | 2/2011 | Spehr | G06Q 30/02 |
| | | | | 706/13 |

(Continued)

OTHER PUBLICATIONS

Verykios, Vassilios S., Ahmed K. Elmagarmid, and Elias N. Houstis. "Automating the approximate record-matching process." Information sciences 126.1-4 (2000): 83-98. (Year: 2000).*

(Continued)

*Primary Examiner* — Hal Schnee
(74) *Attorney, Agent, or Firm* — Mannava & Kang, P.C.

(57) ABSTRACT

A system for reconciliation comprises a determination engine to determine whether data is structured or unstructured, a data structuring engine to structure the data, and a rule extraction engine to determine relations between pairs of values of a first set and a second set of data. The system further comprises a matching engine to generate a confidence score for each pair of the values, a categorization engine to classify the pairs of values into matched pairs and unmatched pairs, a validation engine to validate matching and classification of the pairs based on a user feedback, and a learning engine to store details pertaining to the validation of the matching and the classification over a period of time. The learning engine forwards the details to the rule extraction engine and the categorization engine to determine the relations between subsequent pairs of values and classify the pairs based on the stored details.

14 Claims, 6 Drawing Sheets (56) References Cited

U.S. PATENT DOCUMENTS

| | | | | |
|---|---|---|---|---|
| 2012/0254143 | A1* | 10/2012 | Varma | G06F 40/30 |
| | | | | 707/706 |
| 2017/0212921 | A1* | 7/2017 | Wu | G06N 20/00 |
| 2018/0144258 | A1* | 5/2018 | Rahamim | G06N 5/025 |
| 2018/0152478 | A1* | 5/2018 | Zhou | H04L 63/0263 |
| 2018/0181644 | A1* | 6/2018 | Lyons | G06F 16/951 |
| 2018/0336185 | A1* | 11/2018 | Fink | G06F 40/30 |

OTHER PUBLICATIONS

Zhao, Huimin, and Sudha Ram. "Entity matching across heterogeneous data sources: An approach based on constrained cascade generalization." Data & Knowledge Engineering 66.3 (2008): 368-381. (Year: 2008).*

* cited by examiner

DATA RECONCILIATION

TECHNICAL FIELD

The present disclosure relates to smart reconciliation operations and, more particularly, to systems and method for matching values to perform reconciliation operations.

BACKGROUND

Reconciliation is an important process in Record-to-Report processes in the realm of corporate operations. For example, in corporate financing, reconciliation is performed between bank statements and cash accounts within a general Ledger, between a ledger and a sub-ledger, between inter-company ledgers, and between multiple Enterprise Resource Planning (ERP) systems.

The purpose of reconciliation is to ensure that there is a "single version of truth". This is because each accounting process usually incurs multiple accounting events, and results in multiple recordings at different part of the general ledger. Additional reconciliations may occur in order to cash processes where payments are reconciled with invoices as well as in procure-to-pay processes where a two-way or a three-way matching is performed among invoices, purchase orders, and goods/services received. As is generally known, in the two-way matching process, quantity and an amount on an invoice are matched with quantity and an amount on a corresponding purchase order. On the other hand, the three-way matching process may be used when an operating location is using an online receiving technique. In the three-way matching process, an invoice is matched to a corresponding purchase order for quantity and an amount and to receiving information.

The fundamental challenge for reconciliation arises from a lack of syntactical and semantic interoperability between or among different data sources. For example, different banks may have different formats for bank statements or a bank may change its statement format from time to time or entities may be described differently between data sources.

Further, in some Reconciliation operations, a bank statement or a general ledger entry may correspond to multiple entries in its counterpart. For example, a bank may consolidate all Accounts Payable (AP) entries for a given day into one single amount. On the other hand, the general ledger may contain details and amounts of each AP Payment for that particular day. The challenge in such situations is to determine a combination of transactions in the general ledger which would amount to a single transaction reflected in the bank statement. This problem is similar to a well-known problem known as "Knapsack Problem", which falls into the category of NP-Complete problems. As would be appreciated by one or ordinary skill in the art, a NP-Complete problem is a problem which is proven to have no simple solution or the solution is computationally expensive.

Moreover, reconciliations have been one of the most labor intensive processes in spite of the availability of automatic matching tools. The conventionally available tools for reconciliations can only perform one-to-one matching and, therefore, leave complicated and fuzzy matching to humans. None of the currently available tools accommodate complex based fuzzy reconciliation rules. In fact, accommodation of such complex rules for even a single process may demand major redevelopment of a tool turning it into a non-scalable solution. Therefore, one of ordinary skill in the art will appreciate that the currently available techniques for reconciliation are fragmented, inaccurate, time-intensive, and complicated.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present subject matter describes systems and a method for matching values in order to perform reconciliation operations. According to an example of the present disclosure, the system may include a receiving engine, a determination engine, a data structuring engine, a rule extraction engine, a matching engine, a categorization engine, a validation engine, and a learning engine.

The receiving engine may receive data for performing reconciliation operations. The data may include a first set of data from a first source and a second set of data from a second source. In an example embodiment, the first set of data and the second set of data may include, but are not limited to, cash accounts, bank statements, emails, and check details. The first source and the second source may include, but are not limited to a general Ledger, a ledger, a sub-ledger, intercompany ledgers, and multiple Enterprise Resource Planning (ERP) systems.

Upon receiving the data, the determination engine may determine whether the data is structured or unstructured. In an example embodiment where the data is determined to be unstructured, the data structuring engine may structure the data by using at least one of an Optical Character Recognition (OCR) technique and any Sequence labeling technique such as, for example, Conditional Random Field (CRF) modeling.

Once the unstructured data is converted into structured data or when the receiving engine receives structured data, the rule extraction engine may compare values of the first set of data with values of the second set of data. In an example embodiment, each value of the first set of data may be compared with each value of the second set of data. Further, the rule extraction engine may determine relations between compared pairs of values of the first set of data and the second set of data, based on an Artificial Intelligence (AI) technique. These AI techniques may include, for example, Decision Tree Classifiers, Random Forests, Data Correlation Techniques, Fuzzy Rule Generation and the like.

In an example embodiment, the matching engine may generate a confidence score for each pair of the compared values. The confidence score is indicative of matching of a value of the first set of data with a value of the second set of data of the pair. In an example embodiment, the confidence score may be directly proportional to a degree of matching of a pair of values. Therefore, as the degree of matching increases, the confidence score may be high.

Further, the categorization engine may classify the pairs of values into matched pairs and unmatched pairs, based on the confidence scores of the pairs of the values. In an example embodiment, a threshold value of the confidence score may be defined, and the classification may be performed based on the threshold value.

Following the classification of the pairs of values, the validation engine may validate matching and classification of the pairs of values. A portion of the validation may be based on a user feedback. The user feedback may be indicative of one of an approval or a rejection by the user.

Furthermore, the learning engine may store details pertaining to the validation of the matching and the classification over a period of time. The details may then be forwarded to the rule extraction engine and the categorization engine. For matching of subsequent pairs of values of the first set of data and the second set of data, the rule extraction engine may determine the relations between the subsequent pairs of values, based on the AI technique and the details stored over the period of time. The categorization engine may classify the pairs of values into matched pairs and unmatched pairs, based on the confidence scores of the pairs of the values and the details stored over the period of time.

The present disclosure offers a comprehensive approach for automating the reconciliation. The present approach has reduced manual intervention to a bare minimum and hence possibilities of errors due to the manual dependencies are eliminated. This may lead to high accuracy and high efficiency of the reconciliation.

When provided with a sample of already reconciled data, the AI engine has the capability to extract the Reconciliation rules from the data itself. In case such data is not available, the Reconciliation Rules can be provided by a user as a one-time configuration setup and, subsequently, the entire reconciliation process may be customized based on the rules. Furthermore, the system has the capability to handle one-to-many matching scenarios by filtering out transactions based on the classification, date or any such criterion which would reduce the number of transactions to be considered for one-to-many match. This would in turn reduce the computational time of the system.

In addition, the system may not only process rules at any level of complexity, the system may also apply and process such rules in a Fuzzy manner. Therefore, the system may inform a user whether a rule is satisfied or not in a particular scenario along with a level to which a particular rule is satisfied by providing the confidence scores. This feature of the system may accommodate for variations within the data due to many factors such as, for example, human error, standard procedures of banks, and process specific variations.

Moreover, the system may provide reasons for matching or not matching of a pair of values. The system may also break down complex rules into smaller rules, and may inform the user about the compliance of each of the rules. Therefore, in case of any doubt, the user doesn't have to look at the data itself, but just has to look at the reasons provided by the system for the mismatch between the pair of values to understand the corresponding issue. Therefore, the present disclosure offers a tool that is flexible yet capable of handling complex reconciliation rules. One of ordinary skill in the art will appreciate that the present disclosure offers a comprehensive, flexible, economic, and time-effective approach for reconciliation.

Figure 1:
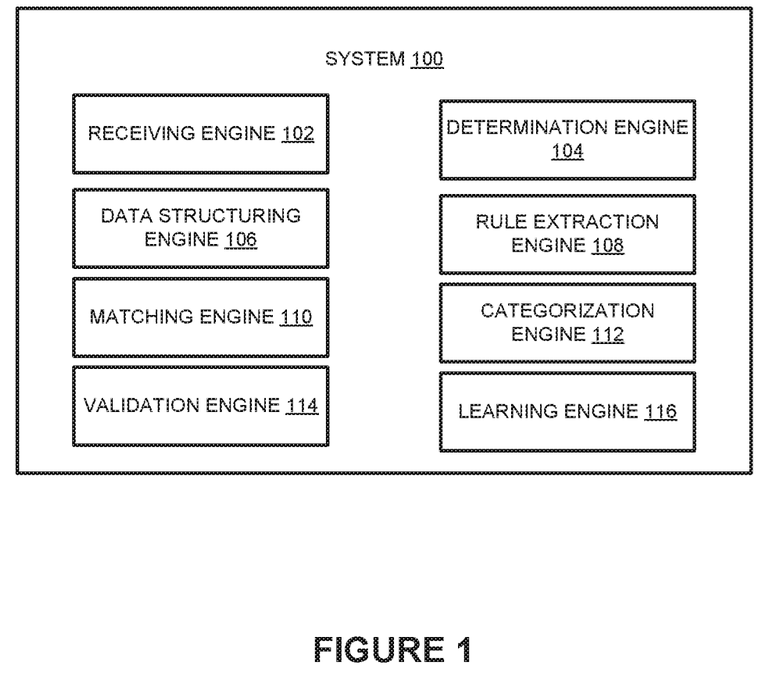
FIG. 1 illustrates a block diagram of a system, according to an example embodiment of the present disclosure.

FIG. 1 illustrates a block diagram of a system 100 for performing reconciliation operations, according to an example embodiment of the present disclosure. The system 100 may include a receiving engine 102, a determination engine 104, a data structuring engine 106, a rule extraction engine 108, a matching engine 110, categorization engine 112, a validation engine 114, and a learning engine 116. The receiving engine 102, the determination engine 104, the data structuring engine 106, the rule extraction engine 108, the matching engine 110, the categorization engine 112, the validation engine 114, and the learning engine 116 may be in communication with each other in order to perform the functionalities of the system 102.

The receiving engine 102 may receive data for performing the reconciliation operations. The data may include a first set of data and a second set of data. In an example embodiment, the first set of data and the second set of data may be received from a first source and a second source, respectively. In an example embodiment, the determination engine 104 may be in communication with the receiving engine 102.

The determination engine 104 may determine whether the data is structured or unstructured. The structured data may be understood as information with a high degree of organization, such that inclusion in a relational database is seamless and is readily searchable by simple search engine algorithms. The structured data is relatively simple to enter, store, query, and analyze. On the other hand, the unstructured data may be understood as information having its own internal structure, but it may not conform neatly into a spreadsheet or database. The unstructured data may be available in the form of complex data sources, such as web logs, multimedia content, emails, customer service interactions, sales automation, social media data, checks, and invoices.

In an example embodiment, the determination engine 104 may determine that the data is structured. In such an embodiment, the determination engine 104 may forward the structured data to the rule extraction engine 108. In an alternative example embodiment, the determination engine 104 may determine that the data is unstructured. In such an embodiment, the determination engine 104 may forward the unstructured data to the data structuring engine 106.

The data structuring engine 106 may structure the unstructured data before forwarding the data to the rule extraction engine 108. In an example embodiment, the data structuring engine 106 may structure the unstructured data by at least one of an Optical Character Recognition (OCR) technique and any Sequence labeling technique such as, for example, a Conditional Random Field (CRF) technique. As would be appreciated by one or ordinary skill in the art, the OCR technique is used for recognizing printed or written text characters. The OCR technique may involve character-by-character photo-scanning of text, analysis of a scanned-in image, and then translation of a character image into character codes commonly used in data processing. Furthermore, one of the methods employed here, the CRF technique, may be understood as a probabilistic framework applied in pattern recognition and machine learning for being used for structured prediction.

The rule extraction engine 108 may be in communication with the determination engine 104 and the data structuring engine 106. In an example embodiment, the rule extraction engine 108 may receive the structured data from the determination engine 104. In another example embodiment, the rule extraction engine 108 may receive the structured data from the data structuring engine 106.

After receiving the structured data, the rule extraction engine 108 may compare values of the first set of data with values of the second set of data. Based on the comparison, the rule extraction engine 108 may determine relations between compared pairs of values. In an example embodiment, the rule extraction engine 108 may determine the relations based on an Artificial Intelligence (AI) technique. In an example embodiment, the AI technique may include, but is not limited to, Natural Language Processing (NLP).

Further, the rule extraction engine 108 may be in communication with the matching engine 110. The matching engine 108 may generate a confidence score for each pair of the compared values. The confidence score is indicative of matching of a value of the first set of data with a value of the second set of data of the pair. The matching engine 110 may be communication with the categorization engine 112. The categorization engine 112 may classify the pairs of values into matched pairs and unmatched pairs. The matched pairs are the pairs of values which get matched based on the corresponding confidence scores. Similarly, the unmatched pairs are the pairs of values which are determined to be not matched, based on the corresponding scores.

The matching engine 110 and the categorization engine 112 may be in communication with the validation engine 114. The validation engine 114 may validate the matching and the classification of the pairs of values. In an example embodiment, the validation engine 114 may receive a feedback from a user for each pair of values with a corresponding confidence score. The feedback is indicative of either an approval or a rejection by the user. The approval by the user for a pair of value may indicate that the matching or the un-matching of the pair is correct. On the other hand, the rejection for a pair of value may indicate that the matching or the un-matching of the pair is incorrect. Further, the validation engine 114 may also receive a feedback from the user with regard to categorization of the pairs of values.

The validation engine 114 may be in communication with the learning engine 116. The learning engine 116 may store details pertaining to the validation of the matching and the classification over a period of time. The details may include, but are not limited to, a record of approval and rejections by the user for each of the pairs of values. The learning engine 116 may forward the details to the rule extraction engine 108 and the categorization engine 112.

Following the storage of the details by the learning engine 116, for subsequent pairs of values from the first set of data and the second set of data, the rule extraction engine 108 may determine relations, based on the AI technique and the stored details. Furthermore, the categorization engine 112 may classify the subsequent pairs of values into matched pairs and unmatched pairs, based on the corresponding confidence scores and the stored details. Consequently, the accuracy of the matching and the categorization of the pairs of values may improve with each cycle of the reconciliation, based on the learning by the learning engine 116.

Figure 2:
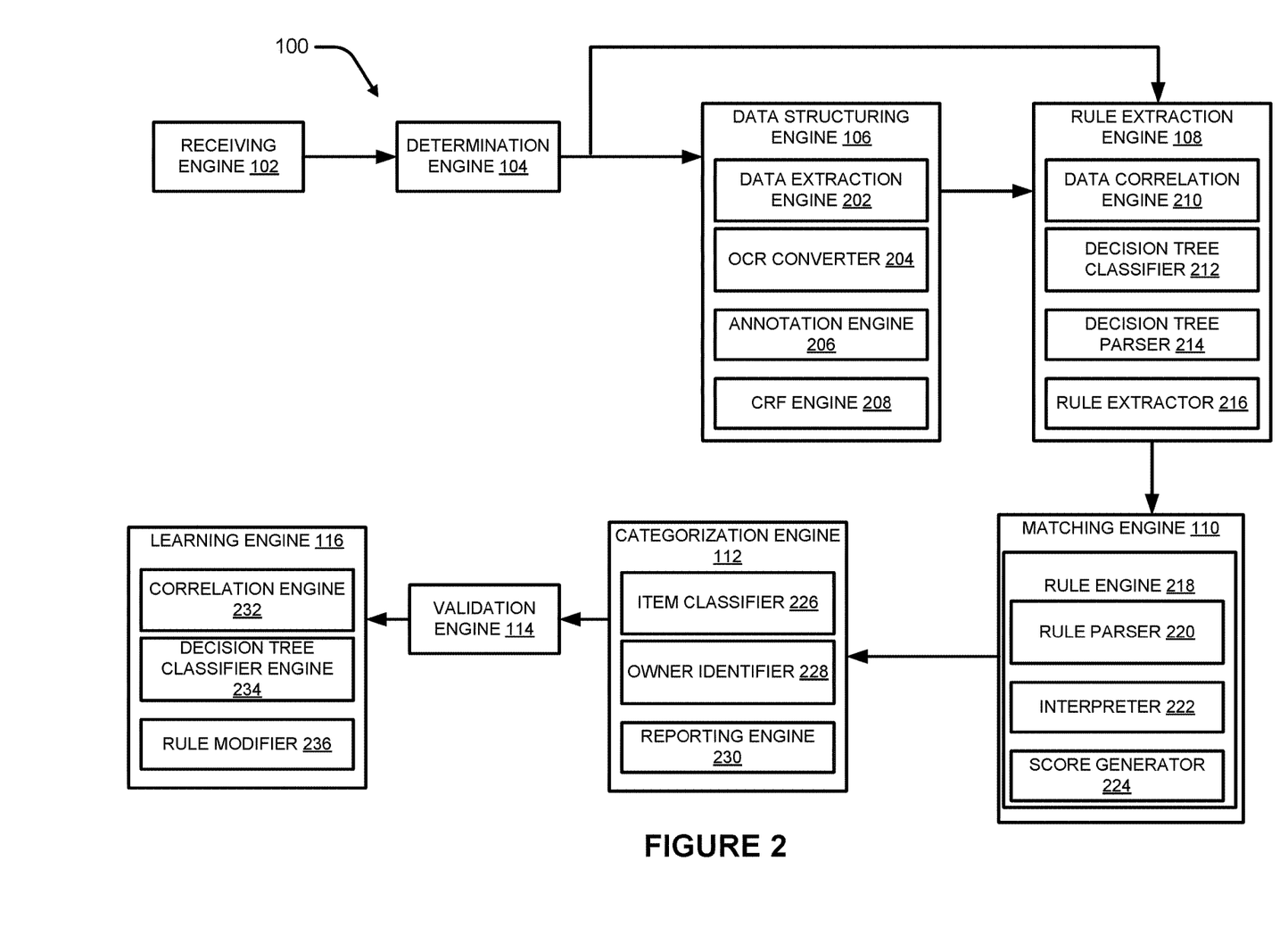
FIG. 2 illustrates another block diagram of the system, according to an example embodiment of the present disclosure.

FIG. 2 illustrates another block diagram of the system 100, according to an example embodiment of the present disclosure. For the sake of brevity, the constructional and operational features of the system 100 that are explained in the description of FIG. 1 are not explained in detail in the description of FIG. 2.

In an example embodiment, in continuation with determination by the determination engine 104 that the data received by the receiving engine 102 is unstructured, the data structuring engine 106 may include a data extraction engine 202 for structuring the unstructured data. The data extraction engine 202 may further include an OCR converter 204, an annotation engine 206, and a CRF engine 208. The OCR converter 204, the annotation engine 206, and the CRF engine 208 may be in communication with each other.

The OCR converter 204 may determine whether the unstructured data is machine-readable. Based on the determination, the OCR converter 204 may convert the unstructured data into an OCR format. In an example embodiment, the OCR converter 204 may convert the unstructured data into the OCR format when it is determined that the unstructured data is not machine-readable. The OCR converter 204 may differentiate the unstructured data between text and non-text.

Furthermore, the annotation engine 206 may annotate the unstructured data based on details to be retrieved from the unstructured data. The annotation engine 206 may annotate such details in the unstructured data for further processing. In an example embodiment, after annotation, the CRF engine 208 may also process the unstructured data for conversion to the structured data. The CRF engine 208 may extract relevant details from the unstructured data. Based on the OCR format, the annotation, and the processing, the data extraction engine 202 may retrieve the relevant details from the unstructured data. Based on the retrieval, the data extraction engine 202 may provide the structured data to the rule extraction engine 108.

In an example embodiment, the rule extraction engine 108 may include a data correlation engine 210, a decision tree classifier 212, a decision tree parser 214, and a rule extractor 216. The data correlation engine 210 may compare the values of the first set of data with the values of the second set of data. In an example embodiment, the data correlation engine 210 may determine operators to be used for the comparison. Further, the data correlation engine 210 may determine relations between compared pairs of values, based on the AI technique. In an example embodiment, based on the values of the first set of data, the values of the second set of data, and the operators, the data correlation engine 210 may determine a set of correlations between the values which may generate accurate matching between the values. The data correlation engine 210 may determine the pairs of values to be compared in order to achieve an effective matching.

The decision tree classifier 212 may generate a decision tree. The decision tree may include a plurality of nodes indicating a rule or a sub-rule having an operator to classify the structured data into matched pairs of the values and unmatched pairs of the values. In an example embodiment, the decision tree classifier 212 may determine the operators for each of the plurality of nodes. The decision tree parser 214 may parse the data through the decision tree. Further, the rule extractor 216 may extract rules from the decision tree, based on the classification performed by each of the plurality of nodes and the parsing. The rules may be combined to generate matching rules which may assist in establishing a relationship between the pairs of values during matching. In an example embodiment, the plurality of nodes may be positioned in a predefined sequence for forming the decision tree and extracting the matching rules.

From the rule extraction engine 108, the data may be forwarded to the matching engine 110. In an example embodiment, the matching engine 110 may include a rule engine 218 which may further include a rule parser 220, an interpreter 222, and a score generator 224. The rule parser 220, the interpreter 222, and the score generator 224 may operate in communication with each other for matching the values of the first set of data and the second set of data, based on the matching rules.

In order to understand the functionality of the rule parser 220 and the interpreter 222, a rule "The Bank Statement description would specify the type of Transaction and the date of the transaction. If this information matches a transaction Description and date along with the Transaction Amount, then a correspondence exists between the two" may be considered. As would be appreciated by one or ordinary skill in the art, the abovementioned rule is a combination of multiple rules. The rule parser 220 may convert or break the rule into a plurality of sub-rules, also referred to as, atomic rules. In an example embodiment, a cash and bank reconciliation process between two different banks may yield a rule that reads as:
IF (Bank Statement Transaction Description CONTAINS General Ledger Transaction Description) AND (Bank Statement Transaction Description CONTAINS General Ledger Transaction Date) AND (Bank Statement Transaction Amount EQUALS General Ledger Transaction Amount) THEN (Bank Statement Transaction MATCHES General Ledger Transaction)

The above rule may be known as a compounded rule. This compounded rule may be broken into a plurality of atomic rules. The plurality of atomic rules may include, but are not limited to, "Bank Statement Transaction Description CONTAINS General Ledger Transaction Description"—(1), "Bank Statement Transaction Description CONTAINS General Ledger Transaction Date"—(2), "Bank Statement Transaction Description EQUALS General Ledger Transaction Amount"—(3), and "IF (1), (2) and (3) are true, THEN, Bank Statement Transaction MATCHES General Ledger Transaction". Therefore, the rule parser 220 may combine the plurality of atomic rules to generate a compound rule as "IF (Bank Statement Transaction Description CONTAINS General Ledger Transaction Description) AND (Bank Statement Transaction Description CONTAINS General Ledger Transaction Date) AND (Bank Statement Transaction Amount EQUALS General Ledger Transaction Amount) THEN (Bank Statement Transaction MATCHES General Ledger Transaction)". The compound rule includes operators connecting the atomic rules to form the compound rule.

The rule parser 220 may forward each of the atomic rules to the interpreter 222. The interpreter 222 may interpret application of the rules to perform a reconciliation operation. The interpreter 222 may process the atomic rules and then execute the compound rule for obtaining an output for which the compound rule is created. The interpreter 222 may execute the compound rule based on the operators, such as CONTAINS, EQUALS, MATCHES, IF, AND, and THEN.

Further, the score generator 224 may generate the confidence score for each pair of the values indicating the strength of the matching of each pair of values. The data from the matching engine 110 may be forwarded to the categorization engine 112. The categorization engine 112 may include an item classifier 226, an owner identifier 228, and a reporting engine 230. The owner identifier 228 may identify an owner in order to determine a reason for the unmatched pairs of values. The owner may be understood as a contact person to resolve an issue corresponding to the unmatched pairs of the values. The reporting engine 230 may inform the user of the owner for resolving the issue. The data from the categorization engine 112 may be forwarded to the validation engine 114.

The validation engine 114 may validate the matching and the categorization as performed by the matching engine 110 and the categorization engine 112, respectively. The validation engine 114 may update the matching and the categorization.

Further, the learning engine 116 may store and forward the details pertaining to the validation and the categorization to the matching engine 110 and the categorization engine 112 for matching and categorization of subsequent pairs of values. In an example embodiment, the learning engine 116 may forward the details to the rule extraction engine 108 to update the decision tree based on the details.

In an example embodiment, the learning engine 116 may include a correlation engine 232, a decision tree classifier engine 234, and a rule modifier 236. The correlation engine 232 may determine relations between the subsequent pairs of values based on the stored details of the validation engine 114. Similarly, the decision tree classifier engine 234 may update the decision tree based on the stored details. The rule modifier 236 may update the matching rules for the matching engine 110 based on the stored details.

Figure 3:
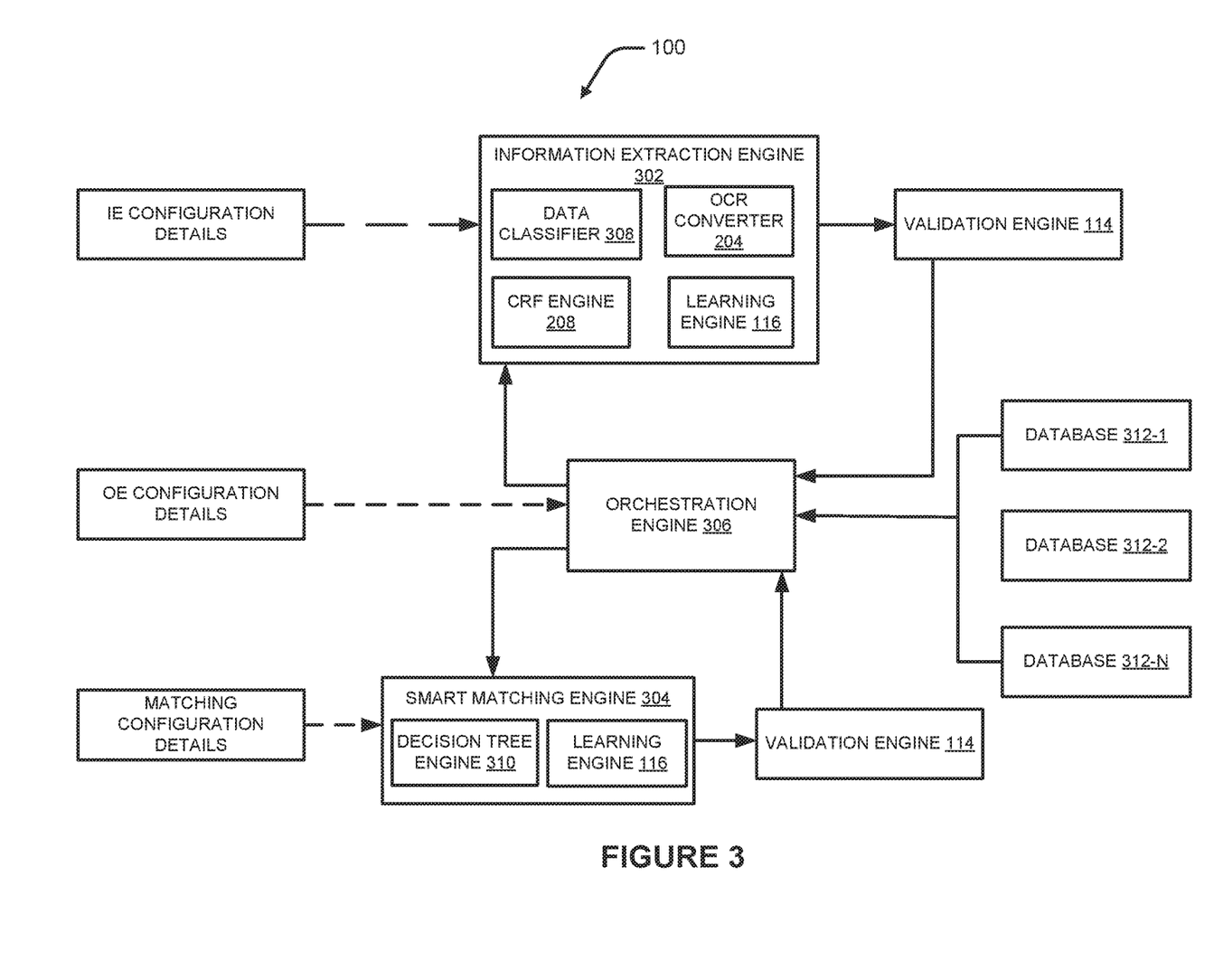
FIG. 3 illustrates yet another block diagram of the system, according to an example embodiment of the present disclosure.

FIG. 3 illustrates another block diagram of the system 100, according to an example embodiment of the present disclosure. For the sake of brevity, the details of the system 100 which are explained in the description of FIG. 1 and FIG. 2 are not explained in detail in the description of FIG. 3. In an example embodiment, the system 100 may include an information extraction engine 302, a smart matching engine 304, and an orchestration engine 306. The information extraction engine 302, the smart matching engine 304, and the orchestration engine 306 may be in communication with each other.

The information extraction engine 302 may include a data classifier 308, the OCR converter 204, the CRF engine 208, and the learning engine 116. The data classifier 308 may perform the functionalities of the determination engine 104. Similarly, the functionalities of the OCR converter 204, the CRF engine 208, and the learning engine 116 may remain the same as explained in the description of FIG. 1 and FIG. 2. The information extraction engine 302 may operate based on information extraction configuration details. The information extraction configuration details may include, but are not limited to, documents, entity names, mapping details, remittance entity names, name mapping details, OCR details, and the details pertaining to validation.

Further, the smart matching engine 304 may include a decision tree engine 308 and the learning engine 116. The decision tree engine 308 may perform the functionalities related to the decision tree as explained in the description of FIG. 1 and FIG. 2. In an example embodiment, the decision tree engine 308 may perform the functionalities of the decision tree classifier 212 and the decision tree parser 214. The smart matching engine 304 may operate based on matching configuration details. The matching configuration details may include, but are not limited to, details pertaining to the learning engine 116.

The operations of the information extraction engine 302 and the smart matching engine 304 may be validated by the validation engine 116. The details pertaining to the validation of the information extraction engine 302 and the smart matching engine 304 as stored by the validation engine 116 may be forwarded to the orchestration engine 306. The orchestration engine 306 may operate based on details received from multiple data sources 310, which may individually be referred to as a database 310-1, a database 310-2, ... and a database 310-n. In an example embodiment, the data sources 310 may include, but are not limited to, check and remittance data, unapplied cash data, receivables and master data, and reconciliation result data. In an example embodiment, the orchestration engine 306 may operate based on orchestration engine configuration details. The orchestration engine configuration details may include, but are not limited to, data source details, a sox policy, an access policy, a batch size, and a frequency.

In an example embodiment, the orchestration engine 306 may be in communication with the information extraction engine 302 and the smart matching engine 304. The orchestration engine 306 may forward the details pertaining to the validation to the information extraction engine 302 and the smart matching engine 304.

In an example embodiment, the data may be a set of emails pertaining to a shipping company. The receiving engine 102 may receive the set of emails from an email server (not shown). The determining engine 104 may determine that the set of emails is unstructured data. The set of emails may be determined as the unstructured data as the relevant details are in the set of emails, but exact position of such details in the mails is not known. Once the data is determined as the unstructured data, the data may be forwarded to the data structuring engine 106 for conversion to structured data.

In the data structuring engine 106, the OCR converter 204 may differentiate between text and non-text in the emails. Further, the annotation engine 206 may annotate the details of the emails that have to be retrieved, such as a receipt date, a sender, a recipient, a price, and a quantity of item shipped. After annotation, the CRF engine 208 may retrieve the details from the emails and populate the details into a tabular format.

From the data structuring engine 106, the structured data may be forwarded to the rule extraction engine 108. The decision tree classifier 212 may classify the rules in the decision tree. For example, if a credit amount is equal to or within a permissible difference of a debit amount, it would be considered as a matching rule. In one example, a $95 credit amount may be considered matched with a $100 debit amount, when a rule is defined at a corresponding node which instructs acceptance of a value against another value within a tolerance of $5. The decision tree classifier 212 may update the rules of the decision tree based on historical data and the details received by the learning engine 116.

The decision tree parser 214 may determine outcome of such rules at the nodes of the decision tree. The rules may be considered as threshold functions. Further, the rule extractor 216 may extract rules based on permutation and combination possibilities between the values of the first set of data and the values of the second set of data.

Further, the matching engine 110 may match the values and generate the corresponding confidence scores. In one example, a value of a bank statement may be $96 and a payment of $95 may not be shown as an exact match. However, if the operator is to detect for an approximate match, the value of $96 may be shown as a payment of $95. However, the confidence score of this match may be less than a match of bank statement of $95 and a payment of $95.

The categorization engine 112 may determine a reason for matching or un-matching of the pairs of values. For example, a payment of $97 may be matched against a bank statement of $100. The categorization engine 112 may determine a reason for the discrepancy, for example, short payment or foreign exchange issues. Such reasons may be learnt by the learning engine 116 for future processing of values. In addition, the validation engine 114 may verify whether the matching and the categorization are correct based on the user feedback.

Figure 4:
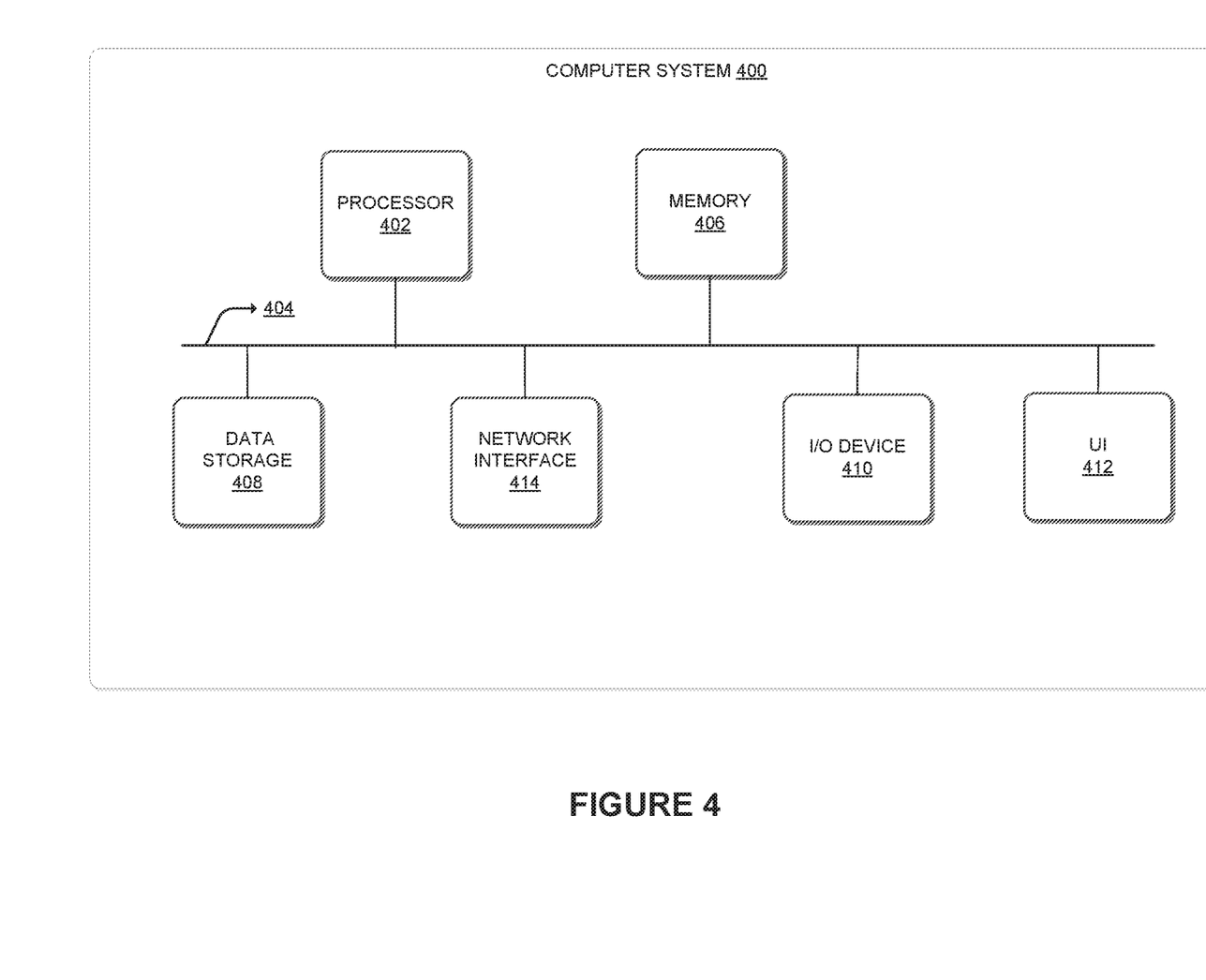
FIG. 4 illustrates a hardware platform for implementation of the system, according to an example embodiment of the present disclosure.

FIG. 4 illustrates a hardware platform 400 for implementation of the system 100, according to an example of the present disclosure. In an example embodiment, the hardware platform 400 may be a computer system 400 that may be used with the examples described herein. The computer system 400 may represent a computational platform that includes components that may be in a server or another computer system. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions, techniques and/or other processes described herein. Commands and data from the processor 402 may be communicated over a communication bus 404. The computer system 400 may also include a main memory 406, such as a random access memory (RAM), where the machine readable instructions and data for the processor 402 may reside during runtime, and a secondary data storage 408, which may be non-volatile and stores machine readable instructions and data. The memory 406 and the data storage 408 are examples of non-transitory computer readable mediums. The memory 406 and/or the secondary data storage may store data used by the system 100, such as an object repository including web objects, configuration data, test data, etc.

The computer system 400 may include an Input/Output (I/O) device 410, such as a keyboard, a mouse, a display, etc. A user interface (UI) 412 can be a communication device that provides textual and graphical user interfaces to a user of the system 100. The UI 412 may operate with I/O device 410 to accept from and provide data to a user. The computer system 400 may include a network interface 414 for connecting to a network. Other known electronic components may be added or substituted in the computer system. The processor 402 may be designated as a hardware processor. The processor 402 may execute various components of the system 100 described above and perform the methods described below.

Figure 5:
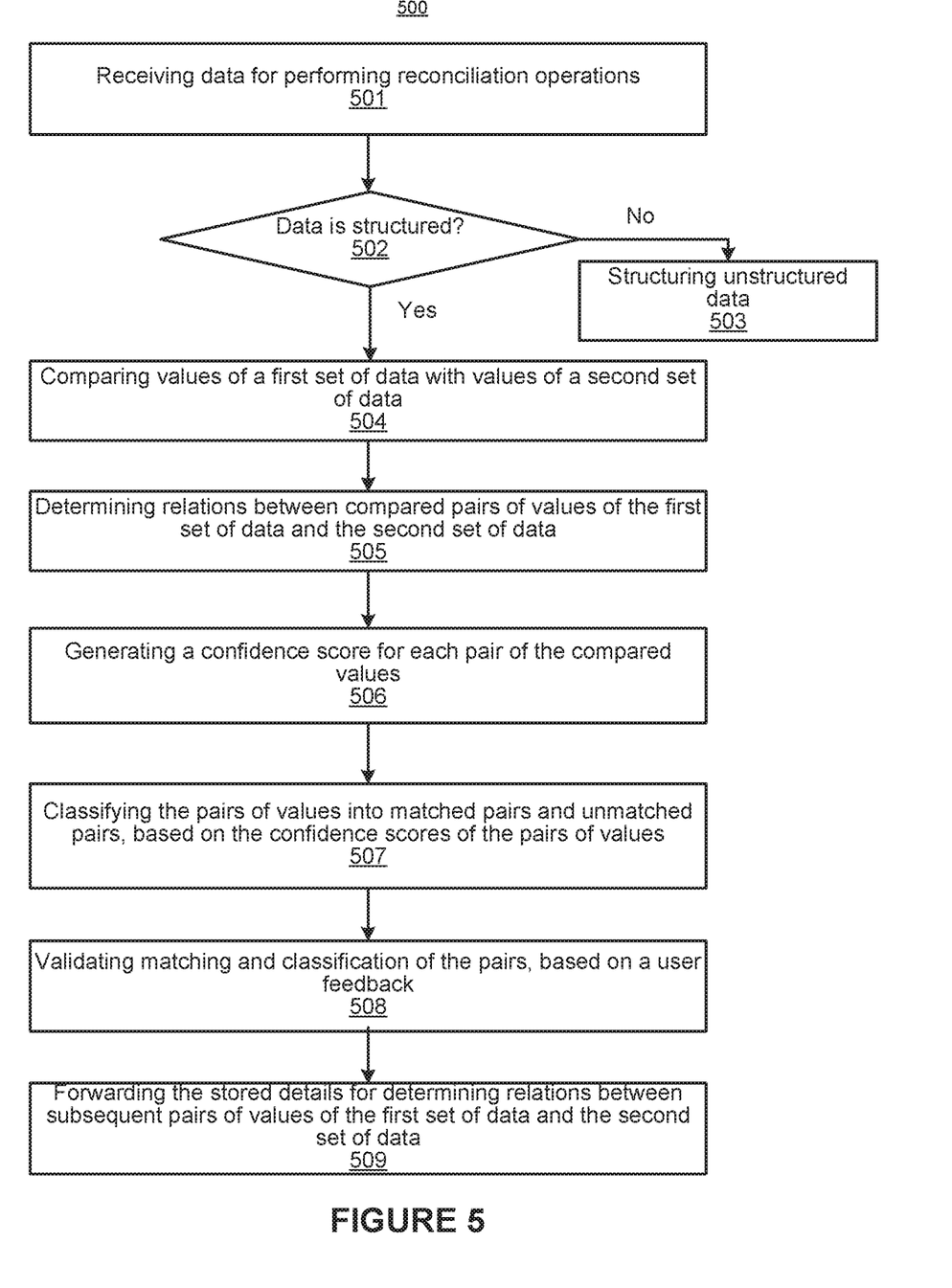
FIG. 5 illustrates a computer-implemented method depicting functionality of the system, according to an example embodiment of the present disclosure.

FIG. 5 illustrates a computer-implemented method 500 depicting functionality of the system 100, according to an example of the present disclosure. For the sake of brevity, construction and operational features of the system 100 which are explained in detail in the description of FIG. 1, FIG. 2, FIG. 3, and FIG. 4 are not explained in detail in the description of FIG. 5.

At 501, the method 500 commences with receiving data for performing the reconciliation operations. The data may include the first set of data from the first source and the second set of data from the second source.

At 502, it is determined whether the data is structured or unstructured. If the data is determined to be the unstructured data, the method 500 branches to 503. At 503, the method 500 includes structuring the unstructured data. The unstructured data is structured by at least one of the OCR technique and any Sequence labeling technique such as, for example, the CRF technique. In an example embodiment, for structuring the unstructured data, the method 500 includes determining whether the unstructured data is machine-readable. Further, the unstructured data is converted into OCR format, when it is determined that the unstructured data is not machine-readable. In an example embodiment, the unstructured data is then annotated based on details to be retrieved. The relevant details are retrieved from the unstructured data, based on the OCR format and the annotation. The method 500 includes providing the structured data, based on the retrieval. After structuring the unstructured data, the method 500 branches to 504. In an alternative example embodiment, when it is determined at 502 that the data is the structured data, the method 500 branches to 504.

At 504, values of the first set of data are compared with values of the second set of data. At 505, relations between compared pairs of values of the first set of data and the second set of data are determined, based on the AI technique. In an example embodiment, the method 500 includes determining the operators to be used for comparing the values of the first set of data with the values of the second set of data. Further, a decision tree is generated. The decision tree includes a plurality of nodes indicating a rule or a sub-rule having an operator to classify the structured data into matched pairs of the values and unmatched pairs of the values. The plurality of nodes is in a predefined sequence. The structured data is then parsed through the decision tree. After parsing, matching rules are extracted from the decision tree, based on the classification performed by each of the plurality of nodes.

At 506, a confidence score is generated for each pair of the compared values. The confidence score is indicative of matching of a value of the first set of data with a value of the second set of data of the pair. In an example embodiment, the method 500 may include converting a rule into a plurality of atomic rules, and combining the plurality of atomic rules to generate a compound rule. The compound rule may include, but is not limited to, operators connecting the atomic rules to form the compound rule. Further, the method 500 may include processing the plurality of atomic rules, and executing the compound rule for obtaining an output for which the compound rule is created.

At 507, the pairs of values are classified into matched pairs and unmatched pairs, based on the confidence scores of the pairs of values. In an example embodiment, an owner is identified in order to determine a reason for the unmatched pairs of values. The owner is indicative of a contact person to resolve an issue corresponding to the unmatched pairs of the values.

At 508, the method 500 includes validating matching and classification of the pairs, based on a user feedback. The user feedback is indicative of one of an approval and a rejection by the user. At 509, details pertaining to the validation of the matching and the classification are stored over a period of time.

At 509, the stored details are forwarded for determining relations between subsequent pairs of values of the first set of data and the second set of data, based on the AI technique and the stored details. The stored details are used for classifying the pairs of values into matched pairs and unmatched pairs, based on the confidence scores of the pairs of the values and the stored details. In an example embodiment, the method 500 includes forwarding the details for updating the decision tree based on the stored details.

Figure 6:
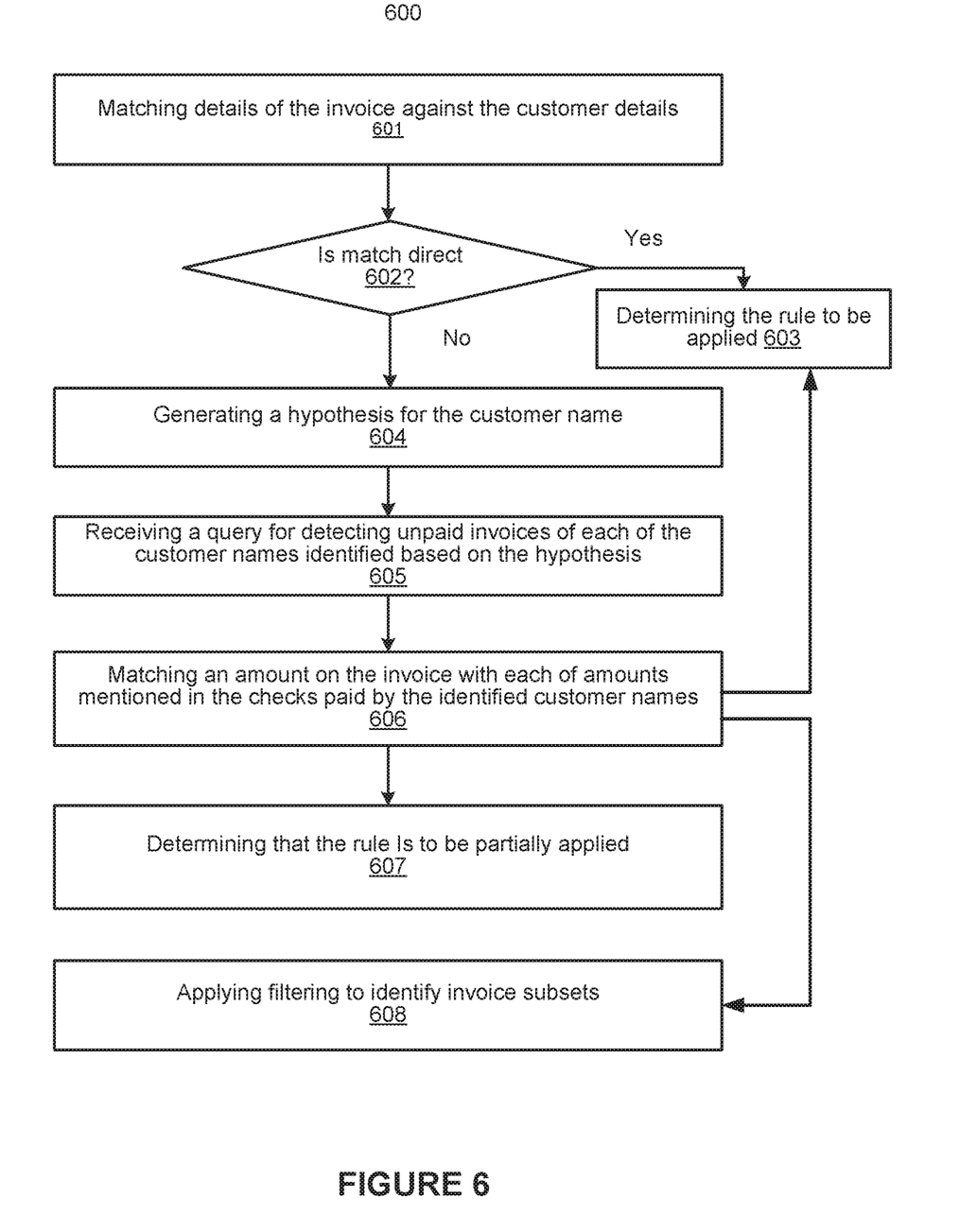
FIG. 6 illustrates another computer implemented method depicting functionality of the system, according to an example embodiment of the present disclosure.

FIG. 6 illustrates another computer-implemented method 600 depicting functionality of the system 100, according to an example embodiment of the present disclosure. For the sake of brevity, construction and operational features of the system 100 which are explained in detail in the description of FIG. 1, FIG. 2, FIG. 3, FIG. 4, and FIG. 5 are not explained in detail in the description of FIG. 6. In an example embodiment, an invoice has to be matched with details of a customer, which may include an address and a customer name. Details mentioned in the invoice may be considered as values of the first set of data and the customer details may be considered as values of the second set of data. Although the description of FIG. 6 is explained with respect to the invoice and customer details, it should be appreciated by a person skilled in the art that the description is applicable to any other reconciliation operation, without departing from the scope of the present disclosure.

At 601, the details of the invoice are matched against the customer details. For example, the invoice number is matched with the customer name and the address.

At 602, it is determined whether the match is direct or fuzzy. In an example embodiment, it is determined that the invoice number is related to the customer name as well as the address. In such an example embodiment, the system 100 may determine that the match is direct. The method 600 branches to 603. At 603, the system 100 may determine the rule to be applied.

In an alternative embodiment, at 602, it is determined that invoice is not related to any of the customer names in the second set of data and therefore, the match is fuzzy. In such an example embodiment, the method 600 branches to 604.

At 604, a hypothesis for the customer name is generated. In an example embodiment, the hypothesis may be generated based on details retrieved from the data sources 310.

At 605, a query is received for detecting unpaid invoices of each of the customer names identified based on the hypothesis. At 606, an amount on the invoice may be matched with each of amounts mentioned in the checks paid by the identified customer names. In an example embodiment, the amount of the invoice may match with an amount mentioned on any of the checks paid by the identified customer names. Therefore, the method 600 branches to 603.

In an alternative example embodiment, the comparison may be determined to be unmatched and the invoice amount may be less than the check amount. In such an example embodiment, the method branches to 607 where the rule is determined to be partially applied. In another example embodiment, the comparison may determine to be unmatched and the check amount may be less than the invoice amount. This generates a 1 to Many Matching issue similar to the Knapsack Problem which falls in the category of NP-Complete problems. The present disclosure reduces the computational time of matching the invoice payment to the appropriate customer by filtering the transactions based on the Category Date or any other criterion to reduce the number of invoices that need to be examined for a match. Therefore, the method branches to 608 where the filtering is applied to identify invoice subsets. The filtering may assist in determining an exact and accurate combination of check amounts against the invoice.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
a processor to:
receive data for performing reconciliation operations, wherein the data includes a first set of data from a first source and a second set of data from a second source;
determine whether the data is structured or unstructured;
determine whether the unstructured data is machine-readable;
convert the unstructured data into an Optical Character Recognition (OCR) format, when it is determined that the unstructured data is not machine-readable;
annotate details included in the unstructured data, wherein the details pertain to a receipt date, a sender, a recipient, a price, and a quantity of items shipped;
structure the data, when it is determined that the data is unstructured, wherein the data is structured by an Optical Character Recognition (OCR) technique and a Sequence labeling technique;
retrieve the details from the unstructured data, based on the OCR format, the annotation, and the structuring of the data;
compare, upon structuring the unstructured data and based on the retrieved details or upon receiving the structured data and the retrieved details, values of the first set of data with values of the second set of data; and
determine relations between compared pairs of values of the first set of data and the second set of data, based on an Artificial Intelligence (AI) technique including at least one of Decision Tree Classifiers, Data Correlation Techniques, and Fuzzy Rule Generation;
generate a confidence score for each pair of the compared values, wherein the confidence score is indicative of matching of a value of the first set of data with a value of the second set of data of the pair;
classify the pairs of values into matched pairs and unmatched pairs, based on the confidence scores of the pairs of the values;
validate matching and classification of the pairs based on a user feedback, wherein the user feedback is indicative of one of an approval or a rejection by the user;
store details pertaining to the validation of the matching and the classification over a period of time;
determine relations between subsequent pairs of values from the first set of data and the second set of data, based on the AI technique and the stored details; and
classify the pairs of values into matched pairs and unmatched pairs, based on the confidence scores of the pairs of the values and the stored details;
determine operators to be used for comparing the values of the first set of data with the values of the second set of data;
generate a decision tree, wherein the decision tree includes a plurality of nodes indicating a rule or a sub-rule having an operator to classify the structured data into matched pairs of the values and unmatched pairs of the values;
parse the structured data through the decision tree, wherein parsing the structured data includes:
converting a rule into a plurality of atomic rules; and
combining the plurality of atomic rules to generate a compound rule, wherein the compound rule includes one or more operators connecting the atomic rules to form the compound rule; and
extract matching rules from the decision tree, based on the classification performed by each of the plurality of nodes.

2. The system of claim 1, wherein the plurality of nodes are positioned in a predefined sequence for forming the decision tree and extracting the matching rules.

3. The system of claim 1, wherein the processor is further to identify an owner in order to determine a reason for the unmatched pairs of values, wherein the owner is indicative of a contact person to resolve an issue corresponding to the unmatched pairs of the values.

4. The system of claim 1, wherein the decision tree is updated based on the stored details.

5. The system of claim 1, wherein the processor is further to:
process the plurality of atomic rules; and
execute the compound rule for obtaining an output for which the compound rule is created.

6. A system comprising:
a processor to:
determine whether data including a first set of data received from a first source and a second set of data received from a second source is structured or unstructured;
determine whether the unstructured data is machine-readable;
convert the unstructured data into an Optical Character Recognition (OCR) format, when it is determined that the unstructured data is not machine-readable;
annotate details in the unstructured data, wherein the details pertain to a receipt date, a sender, a recipient, a price, and a quantity of items shipped
structure the data, when it is determined that the data is unstructured, wherein the data is structured by an Optical Character Recognition (OCR) technique and a Sequence labeling technique;
retrieve the details from the unstructured data, based on the OCR format, the annotation, and the structuring of the data;
compare, upon structuring the unstructured data and based on the retrieved details or receiving the structured data and the retrieved details, values of the first set of data with values of the second set of data;
determine relations between compared pairs of values of the first set of data and the second set of data, based on an Artificial Intelligence (AI) technique including at least one of Decision Tree Classifiers, Data Correlation Techniques, and Fuzzy Rule Generation;

generate a confidence score for each pair of the compared values, wherein the confidence score is indicative of matching of a value of the first set of data with a value of the second set of data of the pair;
validate matching of the pairs, based on a user feedback, wherein the user feedback is indicative of one of an approval or a rejection by the user;
store details pertaining to the validation of the matching;
determine relations between subsequent pairs of values of the first set of data and the second set of data, based on the AI technique and the stored details;
determine operators to be used for comparing the values of the first set of data with the values of the second set of data;
generate a decision tree, wherein the decision tree includes a plurality of nodes indicating a rule or a sub-rule having an operator to classify the structured data into matched pairs of the values and unmatched pairs of the values;
parse the structured data through the decision tree, wherein parsing the structured data includes:
converting a rule into a plurality of atomic rules; and
combining the plurality of atomic rules to generate a compound rule,
wherein the compound rule includes one or more operators connecting the atomic rules to form the compound rule; and
extract matching rules from the decision tree, based on the classification performed by each of the plurality of nodes.

7. The system of claim 6, wherein the processor is further to:
receive the data for performing reconciliation operations.

8. The system of claim 6, wherein the processor is further to:
classify the pairs of values into matched pairs and unmatched pairs, based on the confidence scores of the pairs of the values; and
identify an owner in order to determine a reason for the unmatched pairs of values, wherein the owner is indicative of a contact person to resolve an issue corresponding to the unmatched pairs of the values.

9. The system of claim 6, wherein the decision tree is updated based on the stored details.

10. The system of claim 6, wherein the processor is further to:
process the plurality of atomic rules; and
execute the compound rule for obtaining an output for which the compound rule is created.

11. A computer-implemented method executed by at least one processor, the method comprising:
receiving data for performing reconciliation operations, wherein the data includes a first set of data from a first source and a second set of data from a second source;
determining whether the data is structured or unstructured;
converting the unstructured data into an Optical Character Recognition (OCR) format, when it is determined that the unstructured data is not machine-readable;
annotating details in the unstructured data, wherein the details pertain to a receipt date, a sender, a recipient, a price, and a quantity of items shipped;
structuring the data, when it is determined that the data is unstructured, wherein the data is structured by an Optical Character Recognition (OCR) technique and a Sequence labeling technique;
retrieving the details from the unstructured data, based on the OCR format, the annotation, and the structuring of the data;
comparing, upon structuring the unstructured data and based on the retrieved details or upon receiving the structured data and the retrieved details, values of the first set of data with values of the second set of data;
determining relations between compared pairs of values of the first set of data and the second set of data, based on an Artificial Intelligence (AI) technique including at least one of Decision Tree Classifiers, Data Correlation Techniques, and Fuzzy Rule Generation;
generating a confidence score for each pair of the compared values, wherein the confidence score is indicative of matching of a value of the first set of data with a value of the second set of data of the pair;
classifying the pairs of values into matched pairs and unmatched pairs, based on the confidence scores of the pairs of the values;
validating matching and classification of the pairs, based on a user feedback, wherein the user feedback is indicative of one of an approval and a rejection by the user;
storing details pertaining to the validation of the matching and the classification over a period of time;
forwarding the details for:
determining relations between subsequent pairs of values of the first set of data and the second set of data, based on the AI technique and the details stored over the period of time; and
classifying the pairs of values into matched pairs and unmatched pairs, based on the confidence scores of the pairs of the values and the details stored over the period of time;
determining operators to be used for comparing the values of the first set of data with the values of the second set of data;
generating a decision tree, wherein the decision tree includes a plurality of nodes indicating a rule or a sub-rule having an operator to classify the structured data into matched pairs of the values and unmatched pairs of the values;
parsing the structured data through the decision tree, wherein parsing the structured data includes:
converting a rule into a plurality of atomic rules; and
combining the plurality of atomic rules to generate a compound rule,
wherein the compound rule includes one or more operators connecting the atomic rules to form the compound rule; and
extracting matching rules from the decision tree, based on the classification performed by each of the plurality of nodes.

12. The computer-implemented method of claim 11 further comprising identifying an owner in order to determine a reason for the unmatched pairs of values, wherein the owner is indicative of a contact person to resolve an issue corresponding to the unmatched pairs of the values.

13. The computer-implemented method of claim 11 further comprising forwarding the details for updating the decision tree based on the details stored over the period of time.

14. The computer-implemented method of claim 11 further comprising:
processing the plurality of atomic rules; and executing the compound rule for obtaining an output for which the compound rule is created.

\* \* \* \* \*